United States Patent [19]
Pease et al.

[11] Patent Number: 5,583,735
[45] Date of Patent: Dec. 10, 1996

[54] AIRCRAFT VIDEO MONITOR DEPLOYMENT AND RETRACTION APPARATUS

[75] Inventors: Raymond J. Pease, Cerritos; Mark X. Rice, Buena Park, both of Calif.

[73] Assignee: Hollingsead International, Inc., Santa Fe Springs, Calif.

[21] Appl. No.: 183,606

[22] Filed: Jan. 18, 1994

[51] Int. Cl.[6] ................................................. A47B 81/06
[52] U.S. Cl. ........................... 361/170; 307/119; 307/9.1; 361/682; 312/7.2; 248/917
[58] Field of Search ..................... 248/917–924; 348/825, 826, 827; 361/170, 681, 682; 307/9.1, 119, 122, 124; 312/7.2; 353/79

[56] References Cited

U.S. PATENT DOCUMENTS

| | | | |
|---|---|---|---|
| 4,639,106 | 1/1987 | Gradin | 353/13 |
| 5,096,271 | 3/1992 | Portman | 312/7.2 |
| 5,145,128 | 9/1992 | Umeda | 248/918 X |
| 5,181,771 | 1/1993 | Robak et al. | 312/7.2 |

Primary Examiner—Fritz Fleming
Attorney, Agent, or Firm—Harold L. Jackson

[57] ABSTRACT

A video monitor deployment/retraction apparatus includes a frame located in an aircraft overhead compartment and a monitor pivotally mounted on the frame for rotation between a stored and a deployed position. A spring biases the monitor to its stored position where is releasably retained by a locking mechanism. A solenoid and actuating arms selectively disable the locking mechanism to allow the monitor to be lowered to its deployed position and enable a latching mechanism when the monitor has reached its deployed position to retain the monitor in that position. The latching means is disabled when the monitor is bumped by a passenger while in the deployed position to allow the spring to return the monitor to the stored position.

27 Claims, 5 Drawing Sheets

5,583,735

AIRCRAFT VIDEO MONITOR DEPLOYMENT AND RETRACTION APPARATUS

BACKGROUND OF THE INVENTION

1. Field of the Invention

The present invention relates to apparatus for deploying and retracting video screens or monitors and more particularly to such apparatus designed for use in the overhead storage racks of aircraft.

2. Description of the Prior Art

The commercial airlines have found it advantageous to equip their aircraft with video systems to entertain passengers with movies, news events, documentaries, etc. The wide and medium-bodied jet aircraft have sufficient room to accommodate large screens (and associated projectors) positioned above the central seating section or above the aisles. Such wide and medium-bodied jets can also accommodate video monitors in overhead compartments. At least one system has been used to deploy and retract monitors from such overhead compartments. This system, manufactured by Matsushita Avionics Co., employs an electric motor, pulleys and cables to raise and lower the monitors. While the system performs satisfactorily it is complicated, expensive to manufacture and requires considerable space, particularly in depth.

The prior art systems designed for use in aircraft overhead compartments will not fit in the compartments of narrow-bodied aircraft such as DC 9's and MD 80's which have only about three inches of depth (and about 17"×5" in length and width) available in the overhead compartments. To compound the problem of designing a system for narrow bodied aircraft, the U.S. Federal Aviation Agency ("FAA") has placed several requirements on the operation of such systems to prevent the monitor from interfering with passenger movements especially in times of emergency. First, there must be a central control over the deployment of the monitors to prevent accidental deployment. This is generally accomplished through the use of a master switch which must be activated or turned on prior to deployment. Second, the monitors must be automatically retracted upon a failure of aircraft power or a drop in cabin pressure. Third, the system must respond to a passenger bumping the monitor by automatically retracting the monitor.

There is a need for a video monitor deployment and retracting apparatus which will fit into the available space in the overhead compartments of narrow-bodied aircraft and meet the FAA safety requirements (and safety regulations of other countries).

SUMMARY OF THE INVENTION

The video monitor or screen deployment and retraction apparatus of the present invention includes a frame adapted to be mounted in an aircraft overhead compartment. A monitor is positioned within an opening in the bottom wall of the compartment and pivotally mounted on the frame for rotation between a stored position in which the monitor is located within the compartment facing the opening and a deployed position in which the monitor is located in a downwardly extending position for viewing by passengers.

The monitor is biased to its stored position by a suitable spring or other means and retained in the stored position by a locking means, such as an additional spring biased arm when enabled. Latching means, when enabled, retains the monitor in its deployed position. Means, such as solenoid and actuating arms are provided to selectively disable the locking means to allow the monitor to be lowered to its deployed position and for enabling the latching means when the monitor has reached the deployed position.

The apparatus further includes means for selectively disabling the latching means and enabling the locking means when the monitor is bumped by a passenger while in the deployed position to return the monitor to the stored position, via the bias means.

The features of the present invention can best be understood by the following description taken in conjunction with the accompanying drawings in which like components are designated by like reference numerals.

BRIEF DESCRIPTION OF THE DRAWINGS

FIG. 3a is an enlarged cross-section view of the connection between the left corner of the monitor casing (as viewed in FIG. 3) and the sleeve which drives the cam to operate the latching switch;

FIG. 8 is an enlarged side elevational view of the latching switch and activating cam when the monitor is in the deployed position;

DESCRIPTION OF THE PREFERRED EMBODIMENT

Figure 1:
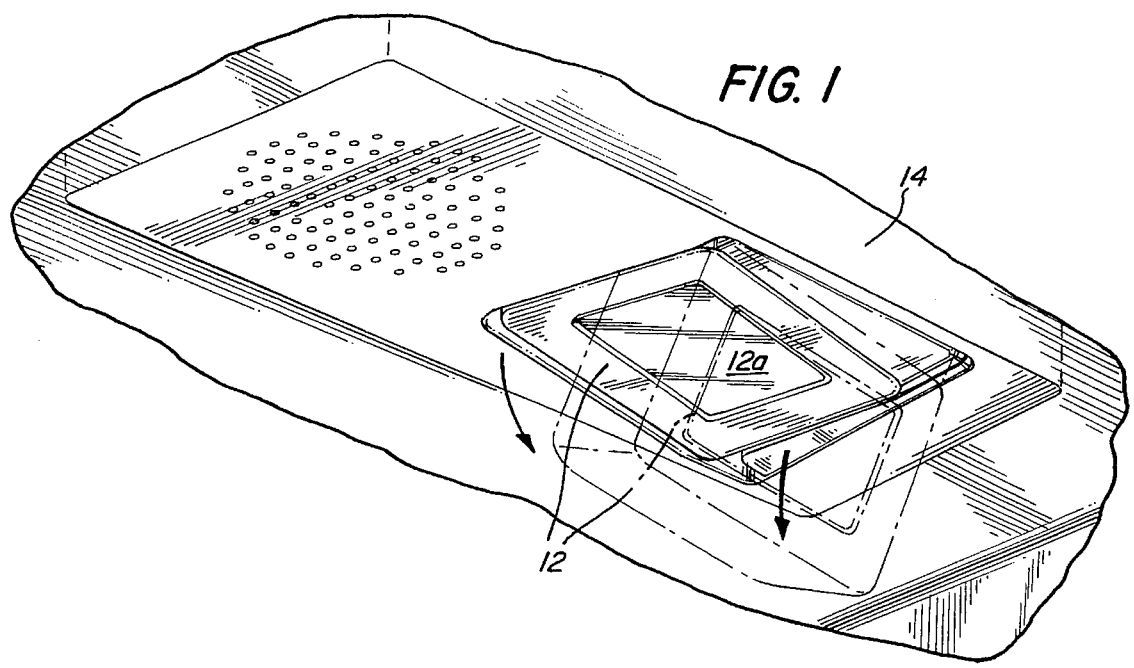
FIG. 1 is a perspective view of a portion of an aircraft overhead compartment with the apparatus of the present invention secured therein and the video monitor shown in its stored position (solid lines) and in its deployed position (dashed lines)
Figure 2:
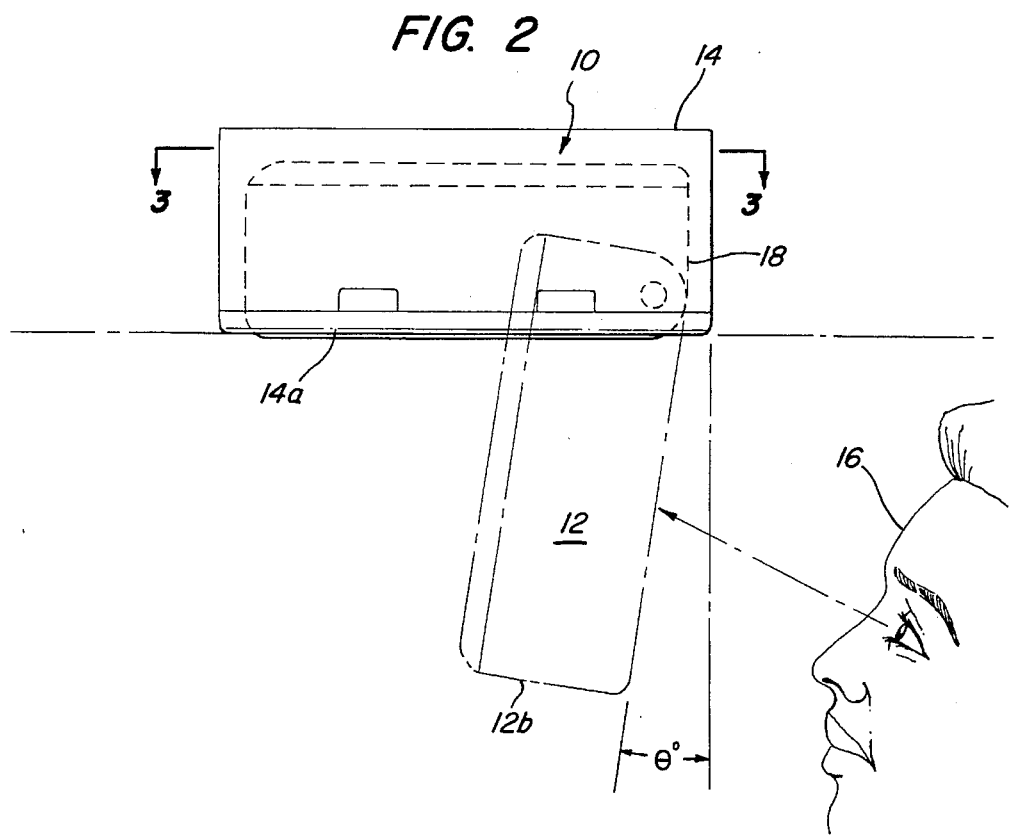
FIG. 2 is a side schematic view of the apparatus of FIG. 1 again showing the video monitor in its stored and deployed position.

Referring now to the drawings and more particularly to FIGS. 1 and 2 an apparatus 10 for deploying and retracting a video monitor 12 including a screen 12a, a casing 12b and electronics (not shown) is mounted in an aircraft overhead storage compartment 14. Typically on narrow-bodied commercial aircraft such as DC 80's a video monitor would be located in the bottom of every third overhead compartment so that up to three rows of passengers 16 can view the monitor 12 when deployed. FIG. 1 illustrates the monitor in its retracted position in sold lines. FIGS. 1 and 2 illustrate the monitor in its downward deployed position in dashed lines. In its deployed position the monitor 12 will typically form an angle θ of about 12° with the vertical.

Figure 3:
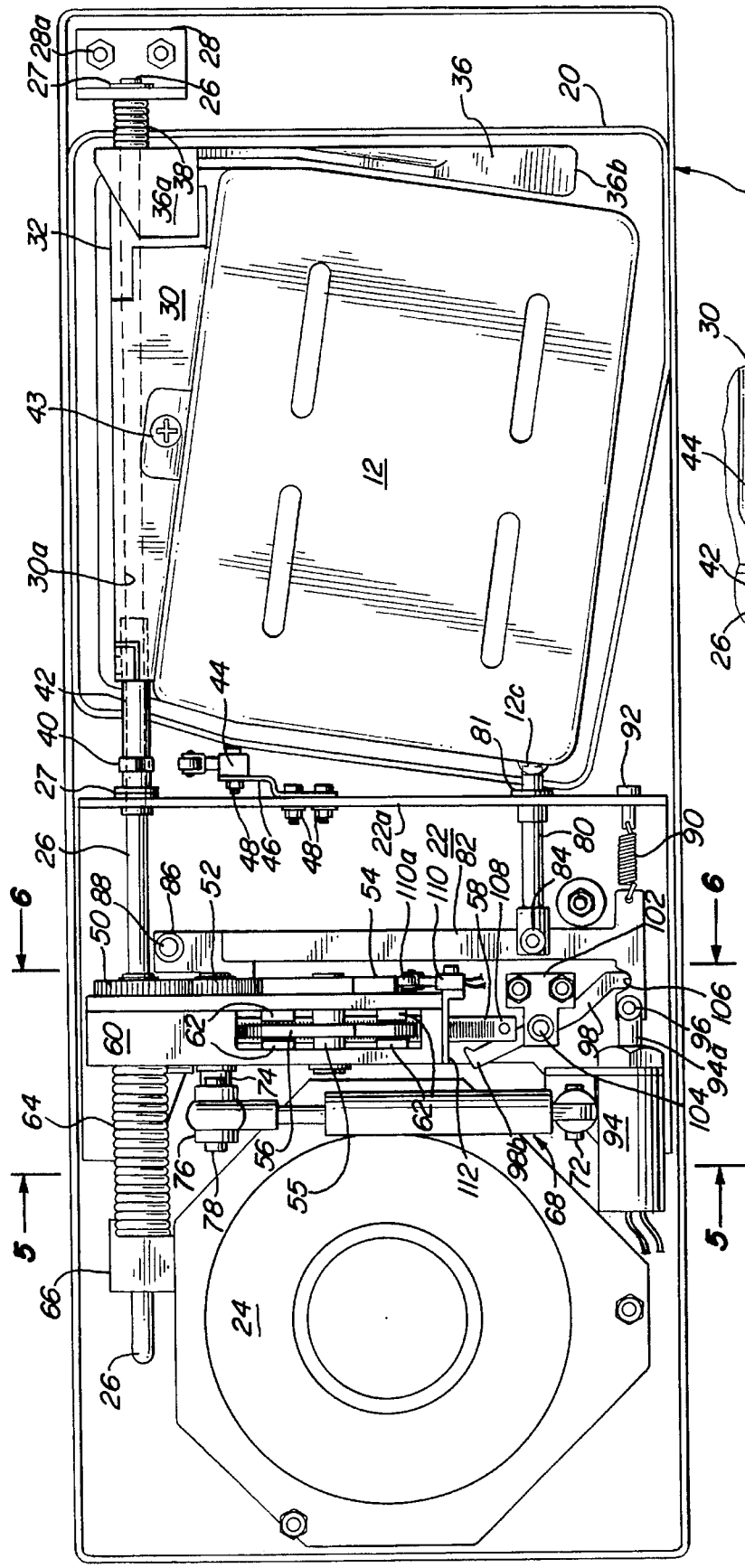
FIG. 3 is a top plan view taken along lines 3—3 of FIG. 1 showing the monitor in the stored or retracted position.
Figure 4:
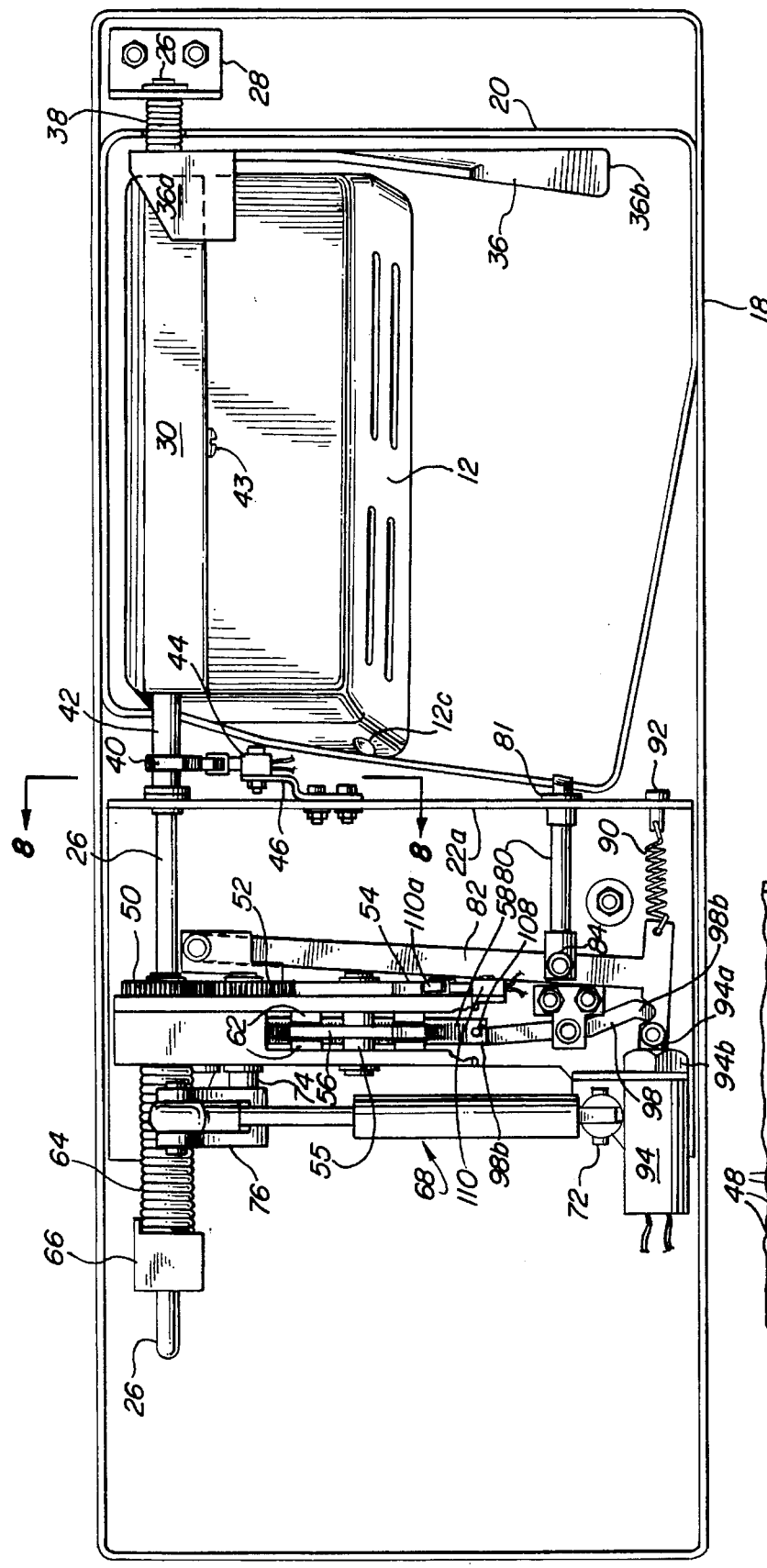
FIG. 4 is a top plan view similar to FIG. 3 showing the monitor in its deployed (lowered) position.
Figure 5:
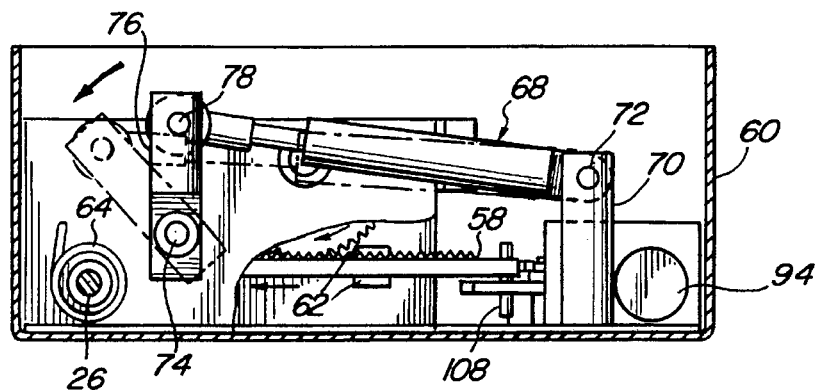
FIG. 5 is a cross-sectional view taken along lines 5—5 of FIG. 3.
Figure 6:
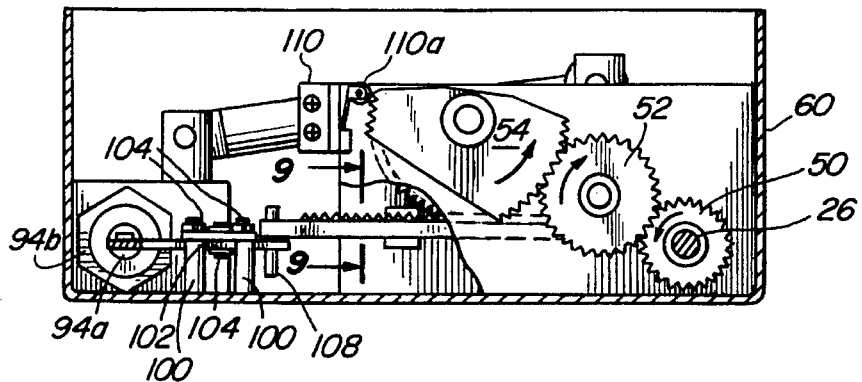
FIG. 6 is a cross-sectional view taken along lines 6—6 of FIG. 3 showing the position of the latching rack and gear train when the monitor is in the stored position.

Referring now to FIGS. 3 and 4, the apparatus 10 includes a frame or housing 18 in the form of a rectangular box, open at the bottom, with a monitor compartment 20 (also open at the bottom) and an L-shaped sub-frame 22 on which a gear train and other components are mounted as will be described. The compartment 20 and the sub-frame 22 may be secured to the top of the housing 18 by suitable means such as welding. A conventional speaker 24 is mounted in the housing for providing the audio output.

A shaft or spindle 26 is rotatably mounted in the housing 18 via bushings or bearings 27 in an angle bracket 28 and a vertical wall 22a of the sub-frame 22. The bracket 28 is secured by suitable bolts 28a to the housing 18.

Figure 10:
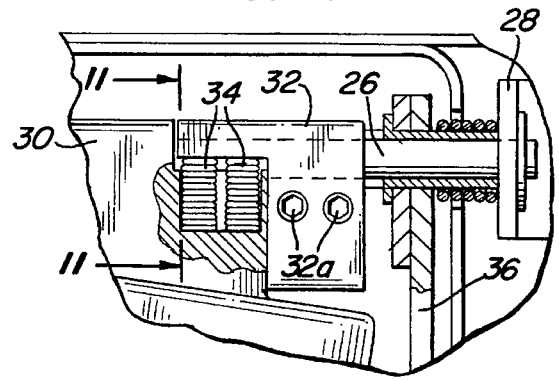
FIG. 10 is an enlarged view, partially in cross-section, of the mounting between the right corner of the monitor housing (as viewed in FIG. 3), the shaft and the frame.
Figure 11:
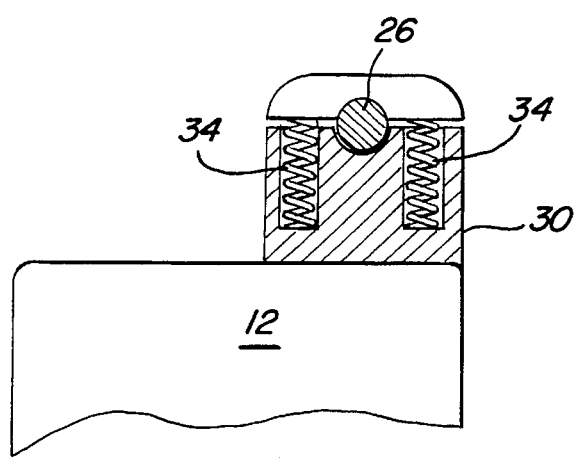
FIG. 11 is an enlarged side elevational view taken along lines 11—11 of FIG. 10.

The monitor casing 12b is mounted to the shaft 26 via a wedge shaped block 30, an L-shaped arm 32 and four springs 34. See FIGS. 10 and 11. The arm 32 is clamped to the shaft by bolts 32a and rotates therewith. The wedge shaped block 30 is secured to the top of the monitor casing 12b via suitable screws or bolts (not shown) and includes a bore 30a through which the shaft 26 freely passes. The springs 34 are arranged symmetrically on each side of the shaft 26, as is best illustrated in FIGS. 10 and 11, to allow a small amount of movement between the shaft and the monitor casing to allow the apparatus to retract the monitor when the monitor is bumped by a passenger without imparting a shock to gears keyed to the shaft as will be explained.

A handle 36 is rotatably mounted on shaft 30 for rotating the monitor to its downward deployed position. The handle includes at its upper end a plate 36a which engages arm 32 after the handle has been rotated a sufficient distance below the bottom 14a of the compartment 14 to accommodate the fingers of an aircraft personnel. For example, the plate 36a may engage the arm 32 after the handle has been rotated through an angle within the range of about 10° to 30° or preferably 10° to 20°. Continued rotation of the lever 36 rotates the arm 32 and the monitor casing 12b (via the springs 34) until the handle strikes the lower edge of the frame 18. At this point, the monitor is in the deployed position as is illustrated in FIGS. 2 and 4. A spring 38 (surrounding shaft 26) is connected between the bracket 28 and the lever plate 36a for biasing the handle toward its raised position so that when the handle is released it will return to its at rest position (i.e., level with the compartment bottom 14a as is illustrated in FIG. 1).

A latching cam 40 is carried by a sleeve 42 which surrounds the shaft 26 (i.e., at the left corner of the casing 12b in FIGS. 3 and 4). The sleeve 42 freely rotates on the shaft and is clamped to the wedge shaped block 30 via a bolt 48. The sleeve 42 and the cam 40 thus rotate in unison with the monitor casing 12b. A screw 43 secures the back of the monitor casing to the block 30.

A latching switch 44 is mounted on the vertically extending portion 22a of the L-shaped sub-frame 22 via bracket 46 and bolts 48. The latching switch 44 includes an actuating arm and roller, collectively identified at 44a, which actuates the switch when the apex 40a of the cam 40 engages the roller (as shown in FIG. 4 and 8) to operate a latching mechanism to retain the monitor in its deployed position as will be explained in more detail.

The mechanism for releasably retaining the monitor in its retracted or deployed position will now be described in connection with FIGS. 3–7. A drive gear 50 is splined (or otherwise secured) to the shaft 26 and drives an intermediate gear 52 and a locking switch actuating gear 54. The gear 54 functions as an eccentric cam for actuating a locking switch 110. See FIGS. 6 and 7.

Figure 9:
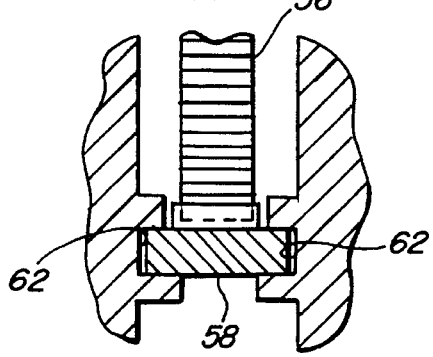
FIG. 9 is an enlarged cross-sectional view of the latching rack and adjacent frame support section.

A pinion gear 56 rotates in unison with the gear 54 (via shaft 55) and drives a rack 58. The gears 50, 52, 54 and 56 are mounted in a gear housing 60 which in turn is secured to the sub-frame 22. The rack 58 is slidably mounted in the gear housing via U-shaped guide channels 62. See FIGS. 3 and 9.

A coil spring 64 is secured at one end to the shaft 26 via a keyed hub 66 and at the other end to the gear housing 60 to bias the shaft in a direction (counterclockwise in FIG. 5) to return the monitor to its retracted and stored position. A speed regulating hydraulic cylinder generally indicated at 68 controls the retraction speed of the monitor to prevent an aircraft personnel's or passenger's finger from being pinched if located between the monitor and the bottom of the compartment during the retraction mode. The speed regulating cylinder comprises a conventional piston and cylinder filled with a suitable hydraulic fluid (e.g., semi-liquid silicon) with a bypass opening which may be adjusted to control the retraction speed. As is illustrated, the cylinder is pivotally connected to the frame 18 at one end via a stationary post 70 and pin 72 and connected at the other end to the gear 52 via shaft 74, post 76 and pin 78. Gear 74 and post 76 rotate with the gear 52 and the shaft 26. See FIGS. 3 and 5.

The monitor is retained in the retracted or stored position by a retaining pin 80 which extends through a bushing 81 in the vertical wall 22a of the sub-frame 22. One end of the pin 80 extends under a shoulder 12c on the outer wall of the monitor casing 12 when the monitor is in the stored position as is illustrated in FIG. 3. The other end of the retaining pin 80 is pivotally mounted to an intermediate section of a T-shaped actuating arm 82 via a pin 84. The actuating arm 82 is pivotally mounted at one end to the gear housing 60 via bracket 86 and pin 88. The lower section of the actuating arm 82 (as pictured in FIG. 3) is connected at one end to the vertical wall 22a of the sub-frame via a tension spring 90 and flat headed pin 92 and at the other end to a plunger 94a of a solenoid 94 via a pin 96. The operation of the solenoid 94 will be explained in conjunction with the wiring diagram of FIG. 12.

A latching lever 98 is pivotally mounted in an intermediate section to the sub-frame 22 via upright posts 100, bolts 101, plate 102 and pin 104. One end 98a of the lever 98 is seated within a recess 106 in the lower section of the arm 82 as is best illustrated in FIGS. 3 and 4. The other end 98b of the lever 98 engages a pin 108 extending vertically through the end of the rack 58 when the monitor is in its deployed position as is shown in FIG. 4.

A double throw, double pole locking switch 110 is mounted to the gear housing 60 via bracket 112. The locking switch 110 includes an actuating arm and roller designated collectively at 110a. The roller 110a rides on the periphery of the gear 54. The gear 54 is cut to provide only a few teeth adjacent the switch 110 so that the roller 110a actuates the switch 110 to make one set of contacts when the monitor is in its stored position (i.e., contacts a and c of FIG. 12) and to make a different set of contacts when the monitor is in its deployed position (i.e., contacts a and b) as will be explained in more detail.

Figure 12:
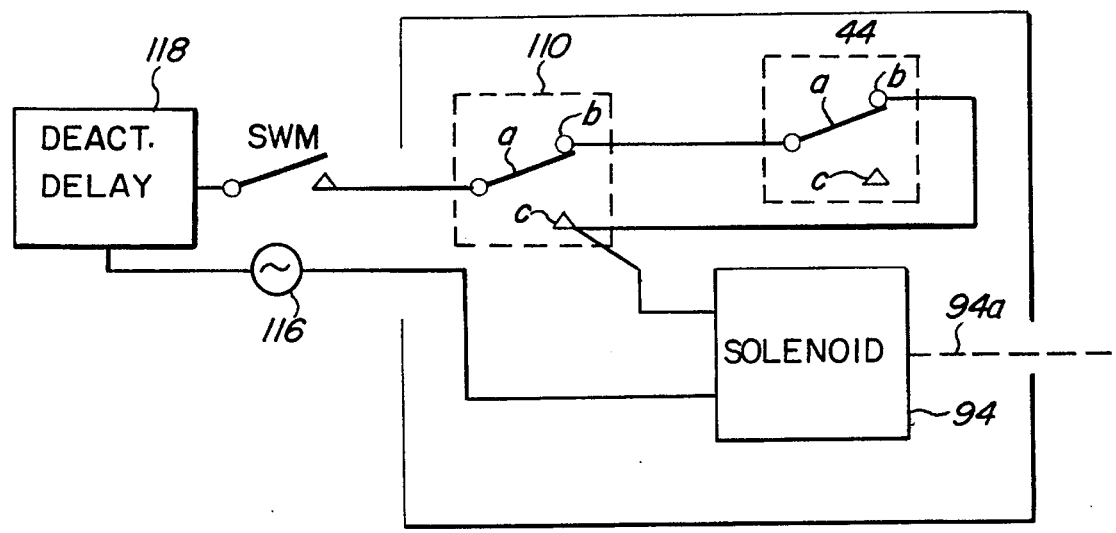
FIG. 12 is a wiring diagram of the switches which operate the solenoid for controlling the latching/locking mechanism.

Referring now to FIG. 12, operating current is supplied to the solenoid 94 from an aircraft (or ground) power supply 116 via a transient deactivation delay circuit 118, main control switch SWM under the control of authorized aircraft personnel, locking switch 110, and latching switch 44.

The locking and latching switches 110 and 44 are shown in the monitor's deployed or operating position in FIG. 12 i.e., the solenoid 94 is energized through the contacts a and b of switches 110 and 44.

When the monitor is in the stored or retracted position the solenoid may be energized via contacts a and c of switch 110. The transient deactivation delay control circuit is optional and may consist of a capacitor of sufficient size to maintain power to the solenoid during the transient time interval (e.g., up to 30 ms) when the aircraft is switching from ground supplied power (i.e., A.P.U.) to aircraft supplied power.

In operation the monitor is normally in its retracted or stored position and retained in that position by the action of spring 90 pulling the actuating arm 82 to the right in FIG. 3 so that the locking pin 80 is positioned under the shoulder 12c of the monitor casing. In this condition the locking pin is enabled. In the stored position the rack 52 is extended with the pin 108 located on one side of the lever 98 as shown in FIG. 3. At this time the locking switch contacts a and c are made and the latching switch contacts a and b are open.

To deploy the monitor an aircraft steward or stewardess closes the main control switch SWM and connects the solenoid to the source of power 116. Solenoid 94 pulls the actuating arm 82 to the left as illustrated in FIG. 4 thereby disabling or releasing the locking pin 80 by disengaging the locking pin from the monitor casing shoulder 12c. The steward or stewardess may then grasp the tip of the handle 36 and pull it down against the force of spring 38 only until plate 36a engages the arm 32 to allow the placement of several fingers around the lever. The lever may now be pulled, overcoming the tension of retraction spring 64 and lowering the monitor until the monitor is in its deployed position and the handle engages the frame 18.

Figure 7:
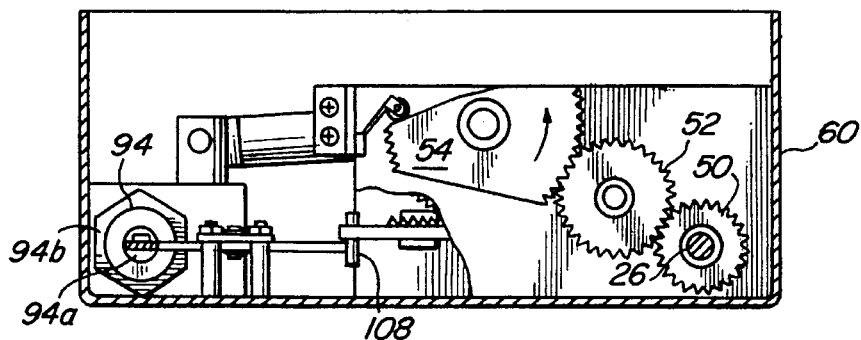
FIG. 7 is a cross-sectional view similar to FIG. 6 showing the position of the latching rack and gear train when the monitor is in the deployed position.

During the deployment mode the roller 110a ceases to engage teeth on the gear 54 and moves outwardly, as is shown in FIG. 7, to cause the locking switch to break its contacts a and c and make contacts a and b. During this same time interval, the latching cam 40 engages the apex 40a of the roller 44a of the latching switch to cause that switch to make its contacts a and b thereby energizing the solenoid 94 through the circuit shown in FIG. 12. Rotation of the shaft 26 also moves the rack 58 (via the gears 52, 54) inwardly (toward shaft 26) allowing the end 98b of the lever 98 to pivot in front of the pin 108 as is illustrated in FIG. 4. The latching means (i.e., solenoid 94, arm 82 and lever 98) is now enabled and the monitor is now latched into the deployed position by the energized solenoid 94.

The monitor will be automatically retracted to its stored position when the latching means is disabled by the de-energization of the solenoid as a result of (a) an aircraft power failure, (b) the opening of the master switch SWM by aircraft personnel or as a result of a drop in cabin pressure or (c) the opening of the latching switch 110 as a result of movement of the monitor. A pressure responsive element (not shown) is arranged to open the master switch SWM when the cabin pressure drops below a preset level. The cam 40 will cause the latching switch 44 to open when the monitor (and the sleeve 42) is moved through a pre-set retraction trigger angle (within the range of about 2°–10° and preferably about ±2°–4°, as determined by the shape of cam 40) from the retracted position as a result, for example, of a passenger bumping the monitor. The coupling means between the monitor and the shaft 26 (i.e., springs 34 and arm 32) allows the monitor (and sleeve 42) to rotate through this retraction trigger angle relative to the shaft 26 to substantially eliminate shocks to the gear train when the monitor is bumped.

There has thus been described a novel video monitor or screen deployment/retraction apparatus which is compact (e.g., requiring only three inches in depth and seven inches in length for a five inch screen), relatively simple and inexpensive to manufacture. The apparatus satisfies the FAA requirements of:

1) deployment of the monitor only upon the actuation of a central or main switch (i.e., SWM);

2) automatic retraction of the monitor upon an aircraft power failure or drop in cabin pressure; and 3) automatic retraction of the monitor when bumped by a passenger or aircraft personnel.

While the apparatus has been designed primarily for small monitors and narrow-bodied commercial aircraft, it may be used for larger monitors and larger aircraft.

Various modifications of the described apparatus will become apparent to those skilled in the art without involving any departure from the spirit and scope of my invention as defined in the appended claims.

What is claimed is:

1. In a video screen deployment and retraction apparatus for use in an overhead storage compartment of an aircraft the combination comprising:

a) a frame adapted to be mounted in the compartment;

b) a video screen mounted in the frame for pivotal movement about a pivotal axis between a stored portion and a deployed operational position for viewing by passengers;

c) bias means for biasing the screen toward its stored position;

d) latching means for holding the screen in its deployed position; and e) latching release means including a solenoid responsive to a predetermined movement of the screen in either direction about its pivotal axis in the deployed position for disabling the latching means whereby the biasing means retracts the screen to its stored position, the latching means including means for energizing the solenoid and the latching release means including means for deenergizing the solenoid.

2. The invention of claim 1 further including a locking pin for selectively holding the screen in its stored position, the solenoid being coupled to the locking pin and whereby the latching means includes means for energizing the solenoid to disable the locking pin whereby the screen may be pivoted from its stored to its deployed position when the locking pin is disabled.

3. The invention of claim 1 further including means for controlling the rate of movement of the screen from its deployed to its stored position.

4. The invention of claim 3 wherein the means for de-energizing the solenoid includes a latching switch responsive to movement of the screen from its deployed position in a clockwise or counterclockwise direction in excess of about 2–10 degrees about the pivot axis.

5. The invention of claim 4 wherein the latching release means further includes a cam carried by the screen for activating the latching switch to energize the solenoid when the screen is moved to its deployed position and to de-energize the solenoid when the screen is rotated clockwise or counterclockwise in excess of said 2–10 degrees from the deployed position.

6. The invention of claim 5 further including a handle coupled to the screen whereby an operator may deploy the screen by rotating the handle.

7. The invention of claim 6 further including means for allowing the handle to rotate through an angle within the range of about 10°–20° before engaging the screen in its stored position.

8. A video monitor deployment and retraction apparatus for use in an aircraft overhead storage compartment having a generally horizontally oriented bottom wall with an opening therein to accommodate the monitor in its stored position comprising:

a) a frame mounted in the storage compartment;
   b) a video monitor positioned within the opening and mounted on a shaft rotatably carried by the frame, the monitor being arranged to rotate with the shaft between a stored position in which the monitor is located within the compartment facing the opening therein and a deployed position in which the monitor is located in a downwardly extending position for viewing by an aircraft passenger;
   c) a spring coupled between the shaft and the frame for biasing the monitor to the stored position;
   d) a source of current;
   e) a solenoid;
   f) a locking arm and a latching pin coupled to the solenoid, the locking pin being arranged to retain the monitor in the stored position when the solenoid is not connected to the current source and to release the monitor from the stored position when the solenoid is connected to the current source, the latching arm being arranged to retain the monitor in the deployed position when the solenoid is connected to the current source and to release the monitor from the deployed position when the solenoid is not connected to the current source;
   g) first and second switches connected between the current source and the solenoid;
   h) means for operating the first and second switches in response to the position of the monitor so that the solenoid is connected to the current source when the monitor is in the stored position and in the deployed position to allow the monitor to be lowered to the deployed position and retained in that position; and
   i) means responsive to the movement of the monitor through a pre-set angle within the range of about 2°–10° on either side of the deployed position for operating one of the switches to disconnect the solenoid from the current source to allow the spring to return the monitor to the stored position.

9. The invention of claim 8 wherein the means for operating the switches to connect the solenoid to the current source includes first and second cams responsive to the position of the monitor.

10. The invention of claim 9 wherein the first cam is arranged to operate the first switch to connect the solenoid to the current source when the monitor is in the stored position.

11. The invention of claim 10 wherein the first and second cams are arranged to connect the first and second switches in series between the current source and the solenoid when the monitor is in the deployed position.

12. The invention of claim 11 wherein the second cam is arranged to operate the second switch to disconnect the solenoid from the first switch and current source when the monitor is moved through said pre-set angle relative to the deployed position, whereby the spring will rotate the monitor to its stored position.

13. The invention of claim 8 further including means for controlling the rate of rotation of the monitor between its deployed and stored positions.

14. The invention of claim 13 wherein the rate of rotation controlling means includes a hydraulic cylinder.

15. The invention of claim 8 further including a handle rotatably mounted on the shaft and arranged to engage the monitor and rotate the monitor to its deployed position.

16. The invention of claim 15 further including a handle return spring for biasing the handle in a direction to rotate the handle to a stored position within the compartment.

17. The invention of claim 16 wherein the handle is arranged to rotate through a predetermined angle within the range of about 10°–30° from its stored position before engaging the monitor whereby an operator may grasp the handle and rotate it through said predetermined angle against only the handle return spring.

18. The invention of claim 8 wherein the means for operating the first switch to connect the solenoid to the current source includes a gear train and a rack, the rack being arranged to move linearly in response to rotational movement of the monitor.

19. The invention of claim 18 wherein the latching arm is arranged to engage and prevent movement of the rack when the monitor is in the deployed position.

20. A video monitor deployment and retraction apparatus for use in an aircraft overhead storage compartment having a generally horizontally oriented bottom wall with an opening therein to accommodate the monitor in its stored position comprising:

a) a frame mounted in the storage compartment;
   b) a video monitor positioned within the opening and pivotally mounted to the frame, the monitor being arranged to rotate between a stored position in which the monitor is located substantially within the compartment facing the opening therein and a deployed position in which the monitor is located in a downwardly extending position for viewing by an aircraft passenger;
   c) bias means for biasing the monitor to its stored position;
   d) a locking pin for selectively retaining the monitor in the stored position;
   e) a latching arm for selectively retaining the monitor in the deployed position when enabled;
   f) a solenoid coupled to the locking pin and the latching arm, the locking pin retaining the monitor in the stored position when the solenoid is deenergized and the latching arm retaining the monitor in the deployed position when the solenoid is energized;
   g) means for energizing the solenoid when the monitor has reached the deployed position;
   h) means for selectively deenergizing the solenoid when the monitor is in the deployed position to allow the bias means to return the monitor to the stored position; and
   i) the means for deenergizing the solenoid including means responsive to a predetermined minimum rotational movement of the monitor in a clockwise or counterclockwise direction from its deployed position.

21. The invention of claim 20 wherein the means for deenergizing the solenoid further includes means responsive to a failure of electrical power in the aircraft.

22. The invention of claim 20 further including a handle rotatably mounted on the frame and arranged to engage the monitor and rotate the monitor to its deployed position.

23. The invention of claim 22 further including a handle return spring for biasing the handle in a direction to rotate the handle to a stored position within the compartment.

24. The invention of claim 23 wherein the handle is arranged to rotate through a predetermined angle within the range of about 10°–30° from its stored position before engaging the monitor whereby an operator may grasp the handle and rotate it through said predetermined angle against only the handle return spring.

25. The invention of claim 20 further including means for controlling the rate of movement of the monitor from its deployed to its stored position.

26. The invention of claim 31 wherein the means for de-energizing the solenoid includes a latching switch responsive to movement of the monitor from its deployed position in a clockwise or counterclockwise direction about the pivot axis.

27. The invention of claim 26 wherein the means for selectively deenergizing the solenoid further includes a cam carried by the monitor for rotation therewith and a switch responsive to movement of the cam.

* * * * *

UNITED STATES PATENT AND TRADEMARK OFFICE
CERTIFICATE OF CORRECTION

PATENT NO. : 5,583,735
DATED : December 10, 1996
INVENTOR(S) : Pease, et. al.

It is certified that error appears in the above-indentified patent and that said Letters Patent is hereby corrected as shown below:

Col. 10, line 1, "31" should read --20--.

Signed and Sealed this

Third Day of June, 1997

Attest:

BRUCE LEHMAN

Attesting Officer

Commissioner of Patents and Trademarks